United States Patent Office 3,425,895
Patented Feb. 4, 1969

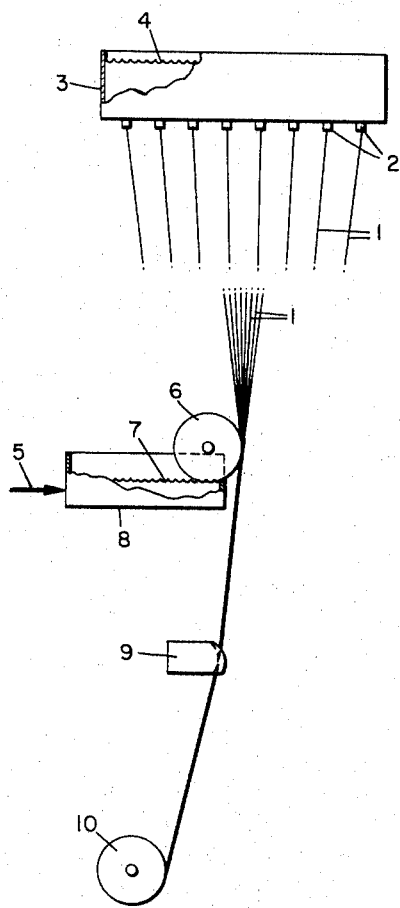

3,425,895
GLASS FIBERS SIZED WITH HYDROFORMYLATED POLYMER AND LAMINATE THEREFROM
Joseph K. Mertzweiller, Baton Rouge, and Neville L. Cull, Baker, La., and Roger S. Hawley, Cranford, N.J.; said Mertzweiller and said Cull assignors to Esso Research and Engineering Company, a corporation of Delaware
Filed Sept. 24, 1965, Ser. No. 489,964
U.S. Cl. 161—204        14 Claims
Int. Cl. B32b 17/10, 17/06

This invention is directed to (A) a process for preparing sized glass fibers using substantially low or nonmigratory water-soluble polymeric binders which are ammonium or organic amine salts of saturated or unsaturated $C_4$ to $C_{20}$ polycarboxylic acid anhydride partial or complete esters of hydroformylated, substantially saturated, low molecular weight polybutadiene polymers; (B) the thus sized glass fibers, and (C) glass fiber laminates or other structures containing the sized glass fibers laminated with natural or synthetic elastomers, thermoplastic resins, thermosetting resins, etc.

More specifically the present invention is directed to glass fibers of improved properties (e.g. workability into woven fabric, strands, twisted multistrand reinforcing members; adhesion compatibility with laminating resins, molding resins, etc.) due to a substantially uniform coating thereon of a water-soluble, substantially nonmigratory, polymeric binder comprising an ammonium or organic amine salt of saturated or unsaturated $C_4$ to $C_{12}$ dicarboxylic acid anhydride partial esters of hydroformylated (hydroxy alkylated) polybutadiene homo or copolymers which are substantially saturated, viz., have a residual unsaturation in the polymer backbone chain usually of less than about 15% of the orginal polybutadiene polymer unsaturation (before hydroformylation). The term "polybutadiene copolymer" as used herein is intended to include copolymers of butadiene with one or more comonomer polymerizable therewith, e.g. styrene, acrylonitrile, methyl styrene, acrylate esters, etc.

These water-soluble amine or ammonium polymer salts can have molecular weights (number average) ranging from about 500 to about 6,000. The polybutadiene homo or copolymer backbone, per se, can have molecular weights (number average) ranging from about 300 to about 4,000. Structurally speaking these polymer salts can be visualized as having a polybutadiene polymer backbone with pendant functional groups which are polyfunctional and contain (next to the backbone) an internal ester function (1) and an external amine or ammonium salt function (2). When an unsaturated polycarboxylic acid anhydride is employed to form the partial or complete ester(s), an intermediately located internal olefin function (3) will be present. In cases where a saturated acid anhydride is used, this will be an alkane moiety. The degree of substitution of these pendant polyfunctional groups can range from 2 to 15 per molecule of backbone substantially saturated butadiene homo or copolymer. According to the present invention it is preferable to use an unsaturated dicarboxylic acid anhydride containing 4 to 12 carbon atoms.

A representative segment of the water-soluble polymer salts whose use is contemplated herein can be visualized as having the following exemplary structure (where an unsaturated dicarboxylic acid anhydride, maleic anhydride is employed):

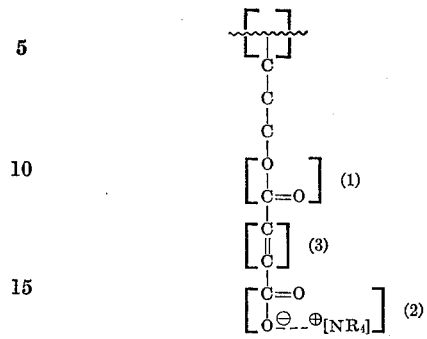

where the rippled line represents the polybutadiene backbone, (1) represents the internal ester function, (2) represents the external amine or ammonium salt function, and (3) represents the internal olefin function. The R groups can be hydrogen, hydroxyl, alkyl, aryl, alkaryl, aralkyl or alkenyl organic groups. The alkyl and alkenyl group(s) or moieties (when present) can be linear straight or branched chain or cyclic, saturated or unsaturated. The aryl groups or moieties (when present) can be mono- or polynuclear, but usually are mononuclear. When one or more of the R groups is organic the total number of carbon atoms in the four R groups can range from 1 to 60 carbon atoms (and more usually from 1 to 20 carbon atoms) with each organic R group containing from 1 to 20 and usually 1 to 12 carbon atoms.

The aqueous glass fiber sizing compositions containing the water-soluble binders employed in accordance with this invention can be used as forming sizes (viz., to aid in forming strands by application to freshly drawn filaments) or finishing sizes (viz., to aid in subsequent working of previously formed strands, e.g. by weaving into cloth, twisting into larger multistrand units or other composite operation) or both.

When used as a forming size, the above polymer salts can be applied to the glass filaments readily by rollers, belts, dipping or any such suitable application procedure.

A glass fiber strand is composed of a multitude of fine glass filaments which are formed by being drawn at a high rate of speed from molten cones of glass located at the tips of small orifices in a bushing, such as shown for example in U.S. Patent 2,133,238. During formation, the filaments are coated while moving at a rapid speed (of the order of 5 to 20,000 ft./min.) with a sizing composition which contains a binder to give the strand integrity for workability, i.e., for twisting, plying, and weaving. If the strand does not have proper integrity, fuzzing occurs during the operations due to filament breaking and eventually the strand is weakened and readily subjected to breaking. The size can also contain a lubricant for the individual filaments to prevent destruction of the strand by abrasion of the individual filaments against each other or against fiber handling equipment during fabrication of the strands. When the glass fibers are to be laminated or molded, it is also desirable to incorporate in the sizing composition a coupling agent to assist in obtaining greater adhesion between the glass fibers and the laminating or molding resin. This also serves to increase the flexural strength of the glass fiber-resin composite articles.

A number of organic silane and siloxane materials have been found to be useful as coupling agents. For example, halogenated or nonhalogenated vinyl and allyl-containing, alkyl-, alkoxy-, alkenyl-, aminoalkyl-, aminoalkoxy, acyloxy, alkenyl acyloxy and similar silanes, their hydrolysis products and polymers of the hydrolysis products are suitable for such use. Some of these suitable silane coupling agents are disclosed in U.S. Patents 2,563,228; 2,688,006; 2,688,007; 2,723,211; 2,742,378; 2,754,237; 2,776,910 and 2,799,598.

In the sizing of glass fibers it is desirable whenever possible to employ a water-soluble binder in the size, in order to avoid the dangers and costs involved in employing organic solvents to distribute the binder onto the glass fibers.

The use of water-soluble binders although desirable usually presents problems. Frequently when employing such water-soluble binders, it becomes necessary to incorporate an emulsifying or dispersing agent in varying amounts based on binder present in the size in order to keep the water-soluble polymers or resins dissolved sufficiently to enable proper application of the size to the glass fiber filaments as they are being drawn. Moreover, frequently difficulty is encountered in obtaining proper compatibility of the water-soluble binder with the silane or other coupling agent employed to assist in securing proper adhesion between the glass fibers and the binder placed thereon.

Another problem encountered in the use of the water-soluble binders in aqueous glass fiber forming or finishing sizes is the migration of the binder from the glass fibers during the drying thereof (e.g., as occurs in the over or air drying of sized glass fiber filaments and/or strands as they are mounted on a forming package). The binder has a tendency to migrate or move outwardly from the center of the forming package to the outside thereof along with the water during drying so that the sized glass fiber filaments and/or strands in the interior of the forming package can have a substantially less uniform distribution and concentration of size thereon compared to those at the outside of the glass forming package. This causes problems in working, e.g. weaving, the sized fibers into cloth or in grouping individual strands into larger strands suitable for use as reinforcing members. The difficulties are encountered by nonuniform films and concentrations of size on the strands from the interior to the exterior of the forming package. Thus strand fuzzing, breakage, and other deleterious effects frequently occur due to the migration of the water-soluble binder on the glass-forming package during drying. This can lead to unfavorable color variations after coronizing (esp. with regard to woven glass fabric), which can result in rejects or a substantial diminishing in the quality of the glass fabric.

Another problem frequently encountered in the use of aqueous glass fiber sizes containing water-soluble polymers and/or resins as binders is that it frequently becomes necessary to use a comparatively large concentration of the water-soluble polymer in the aqueous solution and on the glass fibers in order to insure the distribution of a proper minimum film thickness on the glass fiber filaments and/or strands after drying in order to protect them during the subsequent strand twisting, weaving, grouping or other compositing operations. This increases the cost of the sizing operation and generally accentuates the migration problem referred to hereinabove.

According to the present invention, these and other vexatious problems can be substantially eliminated or minimized by employment of an aqueous glass fiber size containing as the essential binder component water-soluble organic amine or ammonium salts of unsaturated polycarboxylic acid anhydride partial esters of hydroxyl- ated substantially saturated butadiene polymers and copolymers.

Another advantageous feature of this invention resides in the fact that less water-soluble polymer binder is required according to the present invention to accomplish the same and even superior binding power in holding the individual glass fiber filaments together during fabrication than is required using conventional water-soluble polymeric latices and other conventional water-soluble binders. Thus substantial economies can be achieved in accordance with the present invention without sacrificing binding strength; and at the same time enhanced properties can be achieved such as those mentioned above, e.g., reductions in size migration, attainment of better strand integrity, attainment of more uniform adhesion between the glass fiber strands, and between the sized strands and the laminating rubber or resin material which they are employed to reinforce. Another desideratum achieved by this invention is that these water-soluble binders protect against filament breakage (as evidenced by strand fuzziness) while at the same time allowing filament separation to allow ready access of individual filaments to the subsequent rubber or other coating applied to the fibers to aid in separating them thereby reducing abrasion between fibers when the glass fibers are in place as reinforcement, e.g. for molded or laminated plastic articles. Unsized strands separate readily, but the filaments thereof break badly and the unsized strands are unsatisfactory.

The water-soluble polymeric compositions, whose use is contemplated in accordance with this invention, are prepared readily by hydroformylation (oxonation) of a polybutadiene homo or copolymer with carbon monoxide and hydrogen using any suitable hydroformylation catalyst, e.g. a cobalt octacarbonyl phosphine complex or a conventional oxo catalyst, e.g. dicobalt octacarbonyl, etc., to produce hydroxy alkyl substituted, substantially saturated butadiene polymers. The hydroformylated polymers can be considered as precursor polymers of the eventual polymer salts and a segment of these precursors can be visualized as having the following structure:

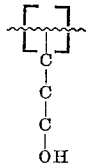

While the hydroxyalkyl substituents on the polybutadiene homo- or copolymer in the above shown representation are hydroxy propyl, there can also be hydroxymethyl substituents although these will usually be present to a much less extent than the hydroxypropyl substituents. As noted hereinabove, the hydroxyalkyl substituents can be present on the butadiene polymer backbone with a degree of substitution of about 2 to 15 per molecule of polymer.

Subsequent to the hydroformylation step, the precursor polymers are reacted thermally (and, usually noncatalytically) with a $C_4$ to $C_{20}$ saturated or unsaturated polycarboxylic acid anhydride at temperatures of about 150 to about 250° F. to yield partial esters. Preferably an unsaturated dicarboxylic acid anhydride is employed at temperatures usually ranging from about 180 to 230° F. The acid anhydride can be saturated or mono- or polyunsaturated and unsubstituted or inertly substituted. Suitably exemplary saturated or unsaturated polycarboxylic acid anhydrides which can be employed include, but are not limited to the following succinic anhydride, phthalic anhydride, tetrahydrophthalic anhydride, pimelic anhydride, maleic anhydride, itaconic anhydride, cyclohexene carboxylic anhydride, viz.,

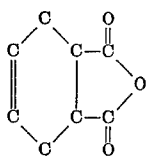

cyclopentadiene carboxylic anhydride, viz.,

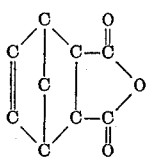

"chlorendic" anhydride, viz.,

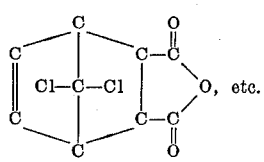

This reaction serves to esterify the pendant hydroxyl groups on the hydroxy alkyl substituents, thereby yielding trifunctional substituent groups similar to the end product polymer salts and which can be depicted in the representative segmental structure indicated hereinbelow (wherein maleic anhydride is the unsaturated dicarboxylic acid anhydride).

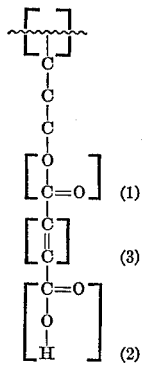

These thermal partial esters have a butadiene polymer backbone as indicated by the rippled line and contain an internal ester function (1), an external carboxyl function (2), which is then neutralized to form an external salt function by reaction with an organic amine or an ammonium salt, and an internal olefin function (3).

The reaction of the organic amine or ammonium compound with the polymeric structure, a segment of which is indicated above, can be conducted readily by reacting said polymer with a suitable organic amine or ammonium compound at temperatures of 50 to 150° F. (usually from about 75 to about 100° F.) using substantially atmospheric pressure. Suitable exemplary organic amines, the use of which is contemplated herein, to prepare the water soluble amine salts of the above indicated polymers include, but are not limited to, the following types of amines: primary, secondary and tertiary aliphatic, alicyclic, aryl amines, alkaryl amines, alkenyl amines, aralkyl amines, and heterocyclic amines (the latter which can contain oxygen, nitrogen and carbon in the ring) of which types the following amines can be lisited as exemplary: methyl amine, ethyl amine, propyl amine, n-butyl amine, isobutyl amine, tert-butyl amine, n-, iso-, and tert-amyl amines, n-hexyl amine, cyclohexyl amine, n-heptyl amine, n-octyl amine, n-nonyl amine, decyl amines; N,N-dimethyl amine, N,N-diethyl amine and the corresponding secondary and tertiary aliphatic alkyl amines; N,N-dimethyl cyclohexyl amine, N,N-diethyl cyclohexyl amine, and the corresponding alicyclic alkyl amines wherein one or more of the alkyl groups is alicyclic; hydroxy containing and hydroxy-substituted aliphatic and alicyclic primary, secondary and tertiary amines, e.g., N,N-dialkyl hydroxy amines, ethanol amine, alkyl monoethanol amines, triethanol amine, etc.; phenyl amine, diphenyl amine, triphenyl amine; N,N-diethyl phenyl amine, N,N-methyl phenyl amine; N,N-diphenyl methyl amine; N,N-butyl cyclohexyl amine; N,N-dibutyl cyclohexyl amine; N,N-dicyclohexyl ethyl amine; allyl amine, diallyl amine, triallyl amine; tolyl amine, ditolyl amine, tritolyl amine; benzyl amine, dibenzyl amine; tribenzyl amine; N,N-dimethyl benzyl amine; ethylene imine, piperidine, 1-methyl pyrrolidine, aniline, morpholine, hexamethyleneimine; pyridine; etc. Suitable exemplary ammonium compounds which can be employed to produce ammonium salts of the above polymers include, but are not limited to, the following: ammonium hydroxide, gaseous ammonia, benzyl trimethyl ammonium hydroxide, tetramethyl ammonium hydroxide, tetraethyl ammonium hydroxide, tetraethanol ammonium hydroxide, etc.

According to another preferred embodiment of this invention, polymeric compositions are prepared and employed which are essentially the same as the organic amine and ammonium salts indicated above except that they contain on the butadiene polymer backbone one terminal mononuclear aromatic chain transfer function as depicted in the below representative segmental structure:

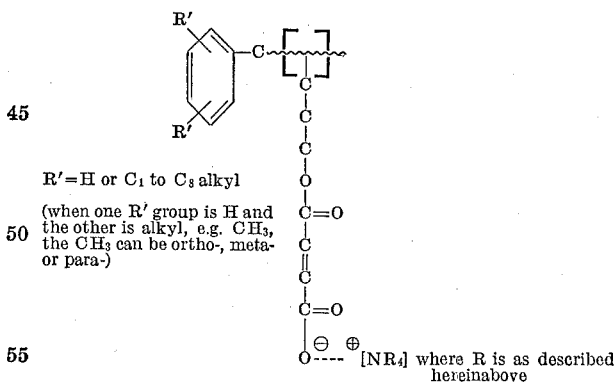

These polymer salts containing the terminal mononuclear aromatic group can be prepared readily by conducting the polymerization of the butadiene homo- or copolymer in the presence of from about 10 to about 60 wt. percent toluene, isomeric xylenes, or other suitable alkylated mononuclear aromatic compound, thereby resulting in the preparation of polymers containing one mononuclear aromatic terminal chain transfer function per molecule of polymer. Then, this terminal chain transfer function-containing polybutadiene backbone polymer is subjected to hydroformylation, esterification with a suitable polycarboxylic acid anhydride, and reaction with an organic amine or ammonium salt in the same manner referred to hereinabove.

The glass fiber sizing composition is then formed by dissolving the above described water-soluble polymer salts in a suitable amount of water to which the silane or other suitable coupling agent is added. The manner of applying the aqueous glass fiber sizes containing the water-soluble polymer salt binder to the individual fibers will be discussed hereinbelow explaining the use of said sizes as forming sizes in conjunction with the sole figure of the drawing.

The figure of the drawing illustrates a schematic view of applying sizing solution to the individual fibers during their formation. The sizing solution is applied to the individual fibers 1 just after their emergence from orifices 2 in an electrically heated, platinum or other suitable bushing 3 containing molten glass 4. The sizing solution is applied to the filaments prior to or at the same time as they are grouped together to form a strand by means of the roller or other suitable applicator 5 which is composed of a rotating roller 6 partially submerged in the sizing solution 7 containing a suitable reservoir 8. Such an applicator can be of the roller type such as shown in U.S. Patent No. 2,728,972. The fibers are grouped into individual strands by a suitable graphite or other guide 9 and wound around a forming tube 10 rotating at approximately 78,000 r.p.m. to produce a strand travel of approximately 12,000 to 15,000 ft./min. Other methods of applying the size to the glass fiber filaments and/or strands such as a pad applicator, a flexible band applicator biased on a two or three roller system, etc., can be employed; and the strand may be formed by means other than winding on the forming tube, such as by means of a pair of rotating wheel pullers which direct the strand onto a suitable collecting device.

The glass fiber strands wound on the forming tube 10 are then subjected to a drying operation. This can be done by heating them while on the forming tube at temperatures and for time periods sufficient to remove substantially all the water therefrom. For example, the sized glass fiber strands on the forming tube can be heated at temperatures ranging from about 200 to 320° F. and usually about 230 to 300° F. and more preferably from about 250 to 280° F. for time periods ranging from 2 to about 10 hours. This drying also causes the silane coupling agent to fix itself to the glass surface, and assist the binder in producing the proper extent of strand integrity required for subsequent working or forming operations wherein the strand can be woven into fabric or fabricated into larger strands.

The weight concentration of the aforementioned water soluble binders in the aqueous glass fiber sizing compositions can range from about 0.1 to about 10 wt. percent in accordance with this invention. Usually the concentration of binder in this size ranges from about 0.2 to about 5.0 wt. percent. The specific preferred concentration of binder will depend upon the specific organic amine or ammonium salt, the molecular weight and nature of the butadiene polymer, the degree of substitution of the pendant polyfunctional groups, etc.

The solid content of the size on the dried strand usually ranges from about 0.05 to 2.0% by weight. It is an advantage of this invention that the size on the dried glass fiber strands is more uniformly distributed throughout the extent of the strands on the forming tube. This assists in attaining a more uniform adhesion between the sized strand and the laminates or molded articles comprising the resin or plastic reinforced thereby.

The above description concerns the use of these polymer salts as glass fiber forming sizes. These polymer salts can also be used as finishing sizes (as will be evident from the below examples) e.g., a size applied to previously coronized woven or unwoven glass fibers to impart desired properties to said fiber for subsequent working or handling operations or in the finished product, itself. The manner of applying the sizing compositions when they are used as finishing sizes is similar to that employed in applying forming sizes, viz., by roller, pad, etc., from aqueous solutions onto the glass fibers.

As mentioned above, the butadiene polymer backbone from which the hydroformylated, partial ester, water-soluble organic amine or ammonium salts are prepared can be a polybutadiene homopolymer or copolymer. Usually the molecular weight of the butadiene polymer backbone ranges from about 300 to about 4,000. These homopolymers and copolymers can be prepared readily by reacting butadiene with or without a suitable copolymerizable monomer at temperatures of −50° F. to +200° F. in the presence of conventional polymerization catalysts. Such catalysts as dispersions of alkali metals, e.g. Li, Na, K, etc., or alkyl derivatives of alkali metals can be used at polymerization temperatures ranging from about −50 to 200° F., and more usually from 0 to 150° F. A suitable ether, e.g. dioxane or tetrahydrofuran can be used to enhance the activity of the polymerization reaction; the ether or a mixture of ether and a hydrocarbon can be the polymerization medium.

Suitable copolymerizable monomers which can be employed to form polybutadiene copolymers include, but are not limited to, the following: styrene, methyl styrene, acrylonitrile, acrylate esters, e.g. methyl acrylate, ethyl acrylate, propyl acrylates, butyl acrylates, 2-ethyl hexyl acrylate; the corresponding hydroxyalkyl acrylates; etc.

The present invention will be illustrated in greater detail by the following examples which are included herein as illustrative of the present invention, and should not be considered limiting thereon.

EXAMPLE 1

A butadiene homopolymer having a number average molecular weight of approximately 900 and containing about 60% of 1,2-butadiene linkages and about 40% of 1,4-butadiene linkages is prepared in accordance with the following procedure:

Butadiene monomer, diluent naphtha and dioxane in an approximate weight ratio of 50:35:15 are fed to a continuous polymerization reactor along with about 3–4 wt. percent Na on butadiene (as a fine dispersion). The polymerization temperature is in the range of 140 to 180° F. and total reaction time is about 6 hours. Conversion of the butadiene monomer is generally 90% or better. The polymer solution contains active catalyst which is then treated with 10 to 50 wt. percent of a suitable clay containing adsorbed moisture, which serves to deactivate the catalyst. After filtration to remove the clay and catalyst residues the solvents are removed under vacuum giving a nearly water white rather fluid polymer having a number average molecular weight of about 900 and a bulk viscosity of about 6 stoke at 75° F.

The above polybutadiene polymer was then hydroformylated as follows:

Seven hundred grams of a 40% benzene solution of the above described polybutadiene along with 6 grams of the cobalt catalyst complex $[Co(CO)_3P(C_4H_9)_3]_2$ in solution in 70 gms. benzene were charged to a 2-liter stirred autoclave. An oxo reaction was carried out at 350–360° F., 1000–1100 p.s.i.g. of synthesis gas (about 1.4/1 $H_2/CO$ volume ratio) for 50 minutes. The gas composition was then enriched with hydrogen to give 15–20/1 $H_2/CO$ volume ratio and the reaction continued at 380–390° F., 1400–1500 p.s.i.g. for 85 minutes. The resulting hydroxylated polymer solution was freed of excess cobalt catalyst by treating with 7 grams of 10% $H_3PO_4$ at 250° F. for one hour followed by filtration. After removal of the solvent under vacuum the viscous hydroxyalkylated polymer had a number average molecular weight of about 1600, an oxygen content of 7.3 wt. percent measured by neutron activation, and a hydroxyl number of 219 (mg. KOH/gram of polymer). This corresponds to about 6.2 functional groups per molecule on the average.

158 grams of this hydroformylated polymer was mixed with 260 grams of toluene to give a 38% polymer solution in toluene. Powdered maleic anhydride (59 grams) were added thereto, and the mixture was heated under reflux with a water trap for 1½ hours at a liquid temperature of 212 to 242° F. About 0.7 cu. cm. of water was recovered in the water trap. The solution of maleic partial esters of the hydroxylated polybutadiene homopolymer had a resin content (nonvolatile materials) of 48% and a Gardner color rating of 1.5, and was essentially odor free. This maleic anhydride partial ester of the hydroxy alkyl substituted polybutadiene homopolymer has a substantially saturated polybutadiene backbone having a residual unsaturation of approximately 8% with pendant polyfunctional groups present in an average degree of substitution of approximately 6 per molecule, each of which possessed an internal ester function, an intermediate internal monoolefin function, and an external carboxyl function. After removal of solvent under vacuum the above polymer was then reacted with triethyl amine at temperatures of 75 to 90° F. for about ½ hour to prepare the triethyl amine salts of the said polymer. This polymer salt was completely soluble in water, and an 38 wt. percent solution of said triethyl amine polymer salt in water was a clear, amber-colored viscous liquid having a pH of 6.9.

Aqueous sizing compositions were then prepared for testing on HG-28 type glass cloth (taffeta weave of 42 by 32 construction) previously heat cleaned (coronized). These aqueous sizing compositions were prepared by dissolving in water a suitable amount of "A-1100" (gamma-aminopropyl triethoxy silane) to form a 1 wt. percent solution thereof. Then sufficient amounts of the various amine or ammonium salts indicated in Table 1 below were added thereto to prepare aqueous solutions containing 0.5 wt. percent of amine or ammonium salt of the abovementioned polymer. The below indicated amine salts were formed as with the triethyl amine salt except using the indicated amine in the salt formation step. These glass fiber finishing sizes then contained 1.0 wt. percent silane coupling agent and 0.5 wt. percent of water-soluble amine or ammonium salt.

Separate samples of the HG-28 glass cloth were dipped in each of the eight amine salt solutions and then hung to air dry overnight. The air dried thus finished glass cloth was then dipped in a 20 wt. percent solution of a rubber cement having the designation "SBR 3217-17-1" which consists of: 100 weight parts of "SBR 1500" (cold type butadiene-styrene rubber), 50 weight parts of SRF (semi-reinforcing) carbon black, 5 weight parts of zinc oxide, 1 wt. part stearic acid, 0.5 wt. part of "Ammox" (a stabilizer which is a reaction product of diphenyl amine and acetone), 10 wt. parts of "Flexon 290" (highly aromatic extender oil having a specific gravity of 0.992 and an aniline point of 107), 2.5 wt. parts sulfur and 0.4 wt. part "Santocure NS" (N-tert butyl-2-benzothiazole sulfenamide). Then the thus coated cloth was hung and allowed to air dry overnight.

The air dried rubber cement coated, finished HG-28 glass cloth samples were then sandwiched (laminated) between two strips of natural rubber having the designation "U.S. Rubber Top Ply Compound 3353-41" which consists of: 100 wt. parts natural rubber (smoked sheets), 45 wt. parts of MPC carbon black, 5 wt. parts zinc oxide, 2 wt. parts stearic acid, 3.25 wt. parts Crystex sulfur, 5 wt. parts heavy pine tar, 2 wt. parts of "BLE-25" antioxidant (a high temperature reaction product of diphenyl amine and acetone), 0.2 wt. part of "JZF" (diphenyl paraphenylene diamine) and 0.55 wt. part "Santocure NS." The respective sandwiches were then cured at 292° F. for 45 minutes.

These cured sandwiches were then evaluated twice each for strip adhesion at room temperature and 250° F. in accordance with ASTM D413-39. The results of this test are tabulated hereinbelow in Table 1. In each case the adhesion of the thus finished and coated glass cloth to the rubber was very strong and closely approached the cohesive strength of the cured rubber, itself, as evidenced by delamination (separation) occurring partly in the rubber near the glass fiber cloth in each instance.

TABLE 1

| Sample Number | Polymer Salt of— | pH of Sizing Solution | Strip Adhesion (Pounds/Inch) at 2 Inches/Minute Pull at— | | | |
|---|---|---|---|---|---|---|
| | | | Room Temp. | | 250° F. | |
| | | | 1 | 2 | 1 | 2 |
| 1 | N,N-diethyl cyclohexyl amine | 8.1 | 12 | 12 | 7 | 7 |
| 2 | N,N-dimethyl benzyl amine | 8.0 | 12 | 11 | 4 | 5 |
| 3 | Piperidine | 8.5 | 16 | 13 | 9 | 9 |
| 4 | Hexamethylene imine | 8.6 | 15 | 13 | 8 | 9 |
| 5 | NH$_4$ | 9.6 | 10 | 11 | 7 | 3 |
| 6 | Pyridine | 5.9 | 15 | 10 | 6 | 2 |
| 7 | Triethanol amine | 7.2 | 10 | 11 | 5 | 5 |
| 8 | Morpholine | 7.5 | 11 | 7 | 7 | 5 |

NOTE.—Good adhesion resulted from all the above sizing solutions.

EXAMPLE 2

This test was conducted to evaluate the ability of the triethyl amine polymer salt binder to preserve strand integrity (resist filament breakage and the resulting fuzziness) while allowing separation between strands thus allowing ready access of individual filaments to rubber or other subsequently applied coatings.

The triethylamine salt of the maleic partial ester of the hydroformylated polybutadiene polymer (prepared as in Example 1) was evaluated both as a forming and as finishing size on pyrolyzed K-37 glass strand by application from aqueous solutions containing 1.0 wt. percent of said triethyl amine salt.

The glass strand was pyrolyzed (to remove a previously applied starch forming size) by passing it at about 70 feet/minute through three one-foot ovens maintained at 1000° F. Then the heat cleaned strands were passed over three chrome plated rollers (4 inches long by 3 inches in diameter) wet with sizing solution. All three rollers were driven separately to partially separate the filaments (approximately 200 per strand) to assist in coating of each individual filament. Then the thus sized strands were dried by passage through seven one-foot ovens maintained at 800° F. The dried sized strands were then wound on 3.5 inch diameter cylinders 9.5 inch long.

Then the dried, sized strands were tested for ease of separation by cutting a short length of the strand and applying light finger pressure to the cut end by topping. The ease of filament separation was observed along with filament breakage.

The triethylamine polymer salt sized K-37 glass strands were compared with pyrolyzed but unsized K-37 glass strands. All the triethyl amine polymer salt-sized strands separated readily with little or no filament breakage and fuzziness. The unsized K-37 strands also separated readily but the filaments broke badly, and the unsized strands were therefore unsatisfactory.

EXAMPLE 3

This test was conducted as in Example 2 above but using aqueous sizing solutions containing 4.0, 2.0, 1.0, 0.5 and 0.25 wt. percent of the triethyl amine polymer salt, respectively. The purpose of this test was to determine the effect of concentration of polymer salt in the aqueous glass fiber size upon its ability to allow filament separation while avoiding filament breakage.

The 4.0 and 2.0 wt. percent sizing solutions of triethyl amine salt were too concentrated since the deposited salt bound the filaments together too firmly to allow easy separation thereof. The 1.0 and 0.5 wt. percent sizing solutions proved very satisfactory and yielded easy filament separation with very little filament breakage. The 0.25 wt. percent sizing solution was fairly effective in that it too resulted in ready separation of filaments; but filament breakage varied from borderline to unsatisfactory. As a result of these tests, it was concluded that the best concentration of triethyl amine polymer salt in the aqueous sizing solution was >0.25 wt. percent, but <2.0 wt. percent.

EXAMPLE 4

This test was conducted to compare the compatibility of the various amine and ammonium polymer salts of Example 1 with a typical silane coupling agent, "A-1100," and the stability of these aqueous solutions.

Separate aqueous solutions were prepared using each of the amine or ammonium salts of Example 1. Each solution contained 1.0 wt. percent of "A-1100" silane coupling agent and 0.5 wt. percent amine or ammonium salt. The compatibility and stability are summarized below in Table 2.

TABLE 2

| Amine Salt | Compatible as Freshly Prepared | Stability, Hours before Precipitation or Separation Occurred |
| --- | --- | --- |
| N,N-diethyl cyclohexyl amine | Yes | 30 |
| Hexamethylene imine | Yes | 24 |
| N,N-dimethyl benzyl | Yes | ~2 |
| Piperidine | Yes | 2 |
| Triethyl amine | Yes | 2 |
| $NH_4$ | Yes | 2 |
| Pyridine | Yes | 2 |
| Triethanolamine | Yes | 2 |
| Morpholine | Yes | 2 |

As will be noted from the above data and observations, all of the amine or ammonium polymer salts were compatible with the silane coupling agent as freshly prepared and stable for at least about two hours thereafter. N,N-diethyl cyclohexyl amine and hexamethylene imine exhibited the greatest stability.

EXAMPLE 5

This test was conducted to evaluate the performance of the N,N-diethyl cyclohexyl amine polymer salt (prepared as in Example 1) as a glass fiber forming size.

An aqueous size solution was prepared containing 0.5 wt. percent of the said N,N-diethyl cyclohexyl amine polymer salt and 1.0 wt. percent A-1100 silane coupling agent.

This sizing solution was applied to glass filaments as shown in the accompanying drawings as they were drawn at a speed of about 9,600 feet/minute from molten cones of glass with approximately 200 filaments to a strand. Then the sized strands were taken up on cardboard forming packages and air dried overnight followed by oven drying at 270° F. for eight hours.

The dried sized strands were unwound from the forming package and thirteen samples (weighing from ~42 to 55 grams) were taken therefrom starting at the outside of the forming package and continuing to the inside thereof. These samples were inspected for strand integrity (absence of strand fuzziness and filament breakage). These samples were acceptable and evidenced very little or no filament breakage.

Then the samples were heated at 1000° F. (heat cleaned) for two hours to determine weight loss variation throughout the forming package. The weight loss variation (difference in percent weight loss) is indicative of size migration during drying (usually the binder migrates outwardly from the center of the forming package to the outside thereof). The results are tabulated below in Table 3.

TABLE 3

| Sample Number | Sample Weight (grams) | | Weight Loss (grams) | Percent Weight Loss |
| --- | --- | --- | --- | --- |
| | Before Heating at 1,000° F. | After Heating at 1,000° F. | | |
| 1 | 42.2158 | 42.1371 | 0.0787 | 0.19 |
| 2 | 50.7058 | 50.6474 | 0.0584 | 0.11 |
| 3 | 51.7616 | 51.7061 | 0.0555 | 0.11 |
| 4 | 51.6326 | 51.5773 | 0.0553 | 0.11 |
| 5 | 47.1911 | 47.1469 | 0.0442 | 0.09 |
| 6 | 53.8478 | 53.8028 | 0.0450 | 0.08 |
| 7 | 47.8360 | 47.7835 | 0.0525 | 0.11 |
| 8 | 55.4490 | 55.3998 | 0.0492 | 0.09 |
| 9 | 46.6436 | 46.6026 | 0.0410 | 0.09 |
| 10 | 53.2998 | 53.2532 | 0.0466 | 0.09 |
| 11 | 50.5534 | 50.5002 | 0.0532 | 0.11 |
| 12 | 52.6307 | 52.5654 | 0.0653 | 0.12 |
| 13 | 49.3511 | 49.2895 | 0.0616 | 0.12 |

This water-soluble amine polymer salt possessed good resistance to migration as evidenced by a difference in percent weight loss from samples 2 through 13 of only 0.04% (sample 6 vs. samples 12 and 13). There was no difference in percent weight loss between samples 2, 3, 4, 7 and 11, and only a 0.02% difference between samples 5, 8, 9 and 10. The difference of 0.11 wt. percent between interior sample 6 and outermost sample 1 is not surprising since binder migration always results in a maximum concentration of binder on the outermost portion of strands of a forming package.

EXAMPLE 6

A hydroxylated polybutadiene as prepared in Example I is reacted with stoichiometric equivalent of succinic anhydride in toluene diluent to obtain the succinate partial ester of the hydroxylated polybutadiene homopolymer. The water-soluble triethyl amine salt and N,N-diethyl cyclohexyl amine salt of this polymer are then formed as in Examples 1 and 2. Both these salts perform satisfactorily as both forming and finishing sizes for glass fibers. Performance of the N,N-diethyl cyclohexyl amine salt of the succinic ester of the hydroxylated polymer as a forming size for glass fibers is about comparable to that of the N,N-diethyl cyclohexyl amine salt of the maleic half ester of the hydroxylated polymer.

EXAMPLE 7

Hydroxylated polybutadiene of about 800 mol. wt. having one terminal benzyl group (chain transfer function) is prepared using hydroformylation conditions in accordance with Example 1. This polymer is then reacted with the stoichiometric equivalent of phthalic anhydride in toluene diluent to give the phthalate partial ester of the hydroxylated polymer. Upon conversion of this partial ester to its N,N-diethyl cyclohexyl amine salt, the aqueous solution of this salt is satisfactory as both a forming and finishing size for glass fibers.

While the above examples illustrate the invention in great detail, it should be understood that the present invention in its broadest aspects is not necessarily limited to the specific materials, conditions and procedures shown in the examples. The present invention is limited only by the claims which follow.

We claim:

1. A method for treating glass fibers which comprises applying to said fibers an aqueous sizing composition containing a binder comprising a water-soluble organic amine or ammonium salt of a $C_4$ to $C_{20}$ polycarboxylic acid anhydride partial ester of a hydroformylated substantially saturated butadiene polymer wherein said butadiene polymer has a molecular weight ranging from about 300 to about 4,000 and said polymer salt has a molecular weight ranging from about 500 to about 6,000, and drying said sized glass fibers.

2. A method as in claim 1 wherein said aqueous sizing composition includes a silane coupling agent.

3. A method as in claim 1 wherein said butadiene polymer is a polybutadiene homopolymer.

4. A method as in claim 1 wherein said butadiene polymer is a copolymer of butadiene with at least one monomer copolymerizable therewith.

5. A method as in claim 4 wherein said copolymerizable monomer is styrene.

6. A method as in claim 4 wherein said copolymerizable monomer is acrylonitrile.

7. A method as in claim 4 wherein said copolymerizable monomer is an acrylate.

8. Sized glass fibers comprising individual glass fibers having a coating thereon of a binder comprising a water-soluble organic amine or ammonium salt of a $C_4$ to $C_{20}$ polycarboxylic acid anhydride partial ester of a hydroformylated substantially saturated butadiene polymer, wherein said butadiene polymer has a molecular weight ranging from about 300 to about 4,000 and said polymer salt has a molecular weight ranging from about 500 to about 6,000.

9. A laminated article comprising the sized glass fibers of claim 8 tightly adhered to a lamina material selected from the group consisting of rubber, thermoplastic resins and thermoset resins.

10. A glass fiber reinforced molded article comprising at least one member selected from the group consisting of rubber, thermoplastic resins and thermoset resins containing as a reinforcing element therein sized glass fibers of claim 8.

11. A method for treating glass fibers which comprises coating said fibers with an aqueous sizing composition containing an organic silane coupling agent and a water-soluble binder comprising an organic amine or ammonium salt of a polymer a segment of which has the structure:

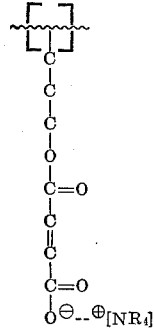

where the rippled line is a substantially saturated butadiene polymer backbone having a molecular weight ranging from about 300 to about 400, and the R groups are selected from the group consisting of hydrogen, hydroxyl, alkyl, aryl, alkaryl, aralkyl, alkenyl or heterocyclic groups, wherein said polymer salt has a molecular weight ranging from about 500 to about 6,000, and the degree of substitution of the pendant polyfunctional salt groups ranges from 2 to 15 per molecule of backbone butadiene polymer.

12. A method according to claim 11 wherein said butadiene polymer backbone contains a terminal mononuclear aromatic group of the formula:

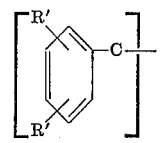

where R' is a member selected from the group consisting of hydrogen or $C_1$ to $C_8$ alkyl groups.

13. A process as in claim 11 wherein said aqueous sizing composition contains from about 0.1 to about 10 wt. percent of said water-soluble binder.

14. A process as in claim 13 wherein the binder concentration ranges from $>0.25$ wt. percent to $<2.0$ wt. percent.

References Cited
UNITED STATES PATENTS
3,116,192  12/1963  Eilerman _____ 156—167

MORRIS SUSSMAN, *Primary Examiner.*

W. J. VAN BALEN, *Assistant Examiner.*